United States Patent
Li

(10) Patent No.: US 9,552,813 B2
(45) Date of Patent: Jan. 24, 2017

(54) SELF-ADAPTIVE INTELLIGENT VOICE DEVICE AND METHOD

(71) Applicant: ZTE Corporation, Shenzhen (CN)

(72) Inventor: Xiangyang Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/434,934

(22) PCT Filed: Jun. 14, 2013

(86) PCT No.: PCT/CN2013/077225
§ 371 (c)(1),
(2) Date: Apr. 10, 2015

(87) PCT Pub. No.: WO2013/182085
PCT Pub. Date: Dec. 12, 2013

(65) Prior Publication Data
US 2015/0262579 A1      Sep. 17, 2015

(30) Foreign Application Priority Data

Oct. 12, 2012    (CN) .......................... 2012 1 0385273

(51) Int. Cl.
*G10L 15/00* (2013.01)
*G10L 15/22* (2006.01)
(Continued)

(52) U.S. Cl.
CPC ............ *G10L 15/22* (2013.01); *G10L 13/033* (2013.01); *G10L 25/03* (2013.01); *G10L 25/48* (2013.01)

(58) Field of Classification Search
USPC ................................. 704/246, 247, 251, 252
See application file for complete search history.

(56) References Cited

U.S. PATENT DOCUMENTS 5,889,223 A      3/1999   Matsumoto
6,498,834 B1 *  12/2002  Sera ..................... G10L 19/0018
                                                              379/88.02
(Continued)

FOREIGN PATENT DOCUMENTS

CN        1811911 A      8/2006
CN      102004624 A      4/2011
(Continued)

OTHER PUBLICATIONS

Supplementary European Search Report for EP Applciation No. 13799812.6 mailed Oct. 30, 2015 (8 pages).
(Continued)

*Primary Examiner* — Leonard Saint Cyr
(74) *Attorney, Agent, or Firm* — Sutherland Asbill & Brennan LLP

(57) ABSTRACT

A self-adaptive intelligent voice device and method, wherein the device includes a voice recognizing module (101), a recognition result processing module (102), a voice broadcasting module (103), and a broadcast voice parameter generating module (104), and the broadcast voice parameter generating module (104) is configured to acquire extracted voice parameters from the voice recognizing module (101), and generate broadcast voice parameters according to the extracted voice parameters and a default policy, and input the broadcast voice parameters to the voice broadcasting module (103), the abovementioned technical solution enables the broadcast voice more closely matching a user's voice.

12 Claims, 2 Drawing Sheets

(51) Int. Cl.
*G10L 13/033* (2013.01)
*G10L 25/03* (2013.01)
*G10L 25/48* (2013.01)

(56) References Cited

U.S. PATENT DOCUMENTS

| | | | |
|---|---|---|---|
| 6,813,606 B2* | 11/2004 | Ueyama | G10L 15/30 704/251 |
| 6,879,954 B2 | 4/2005 | Nguyen et al. | |
| 2003/0014246 A1 | 1/2003 | Choi | |
| 2005/0086055 A1* | 4/2005 | Sakai | G10L 15/01 704/231 |
| 2006/0080105 A1* | 4/2006 | Lee | G10L 15/30 704/270.1 |
| 2006/0184370 A1 | 8/2006 | Kwak et al. | |
| 2007/0168189 A1 | 7/2007 | Tamura et al. | |
| 2011/0238495 A1* | 9/2011 | Kang | G06Q 30/02 705/14.49 |
| 2012/0095767 A1 | 4/2012 | Hirose et al. | |
| 2012/0295572 A1* | 11/2012 | Park | H04M 1/72536 455/404.1 |
| 2013/0005295 A1* | 1/2013 | Park | H04W 76/007 455/404.2 |
| 2013/0019013 A1* | 1/2013 | Rice | G06F 9/5055 709/225 |
| 2013/0019018 A1* | 1/2013 | Rice | H04L 12/66 709/226 |
| 2013/0019282 A1* | 1/2013 | Rice | H04L 67/16 726/4 |

FOREIGN PATENT DOCUMENTS

| | | |
|---|---|---|
| CN | 102237082 A | 11/2011 |
| JP | 2004-198456 A | 7/2004 |
| WO | 2008/018653 A1 | 2/2008 |

OTHER PUBLICATIONS

Rentzos et al., "Voice Conversion Through Transformation of Spectral and Intonation Features," Acoustics, Speech, and Signal Processing, 2004 Proceedings, IEEE International Conference on Montreal, Quebec, Canada, pp. 21-24.

Styliano, "Voice Transformation: A Survey," Acoustics, Speech and Signal Processing, 2009, IEEE International Conference, pp. 3585-3588.

PCT International Search Report for PCT Application No. PCT/Cn2013/077225 mailed Sep. 19, 2013 (6 pages).

* cited by examiner

SELF-ADAPTIVE INTELLIGENT VOICE DEVICE AND METHOD

CROSS REFERENCES TO RELATED APPLICATIONS

This application claims the priority benefit of PCT/CN2013/077225 filed on Jun. 14, 2013 and Chinese Application No. 201210385273.3 filed on Oct. 12, 2012. The contents of these applications are hereby incorporated by reference in their entirety.

TECHNICAL FIELD

The present document relates to the field of intelligent voice, and more particularly, to a self-adaptive intelligent voice device and method.

BACKGROUND

With the development of mobile communication technology and mobile phone manufacturing technology, more and more consumers favor smart phones due to their high performances, a variety of supported services and declining costs.

With the improvement of the smart phone hardware performance and the powerful operating system functions, more and more intelligent applications, including intelligent voice service, can be realized. Compared with the traditional manual human-machine interaction, more and more users prefer intelligent voice due to its more humane and convenient interaction mode, and a series of intelligent voice applications such as siri have been emerged on smart phone platforms such as apple and android.

The existing intelligent voice applications mainly consist of three function modules: a voice recognizing module, a recognition result processing module and a voice broadcasting module.

Wherein the voice recognizing module is used for extracting parameters characterizing a human voice, converting lexical content in the human voice to a machine language file such as a binary code file according to the voice parameters, and sending the machine language file to the recognition result processing module; wherein the parameters characterizing the human voice mainly comprise a formant (frequency, bandwidth, amplitude) and a pitch frequency.

The recognition result processing module is used for performing an appropriate operation based on the machine language file, and sending the operation result to the voice broadcasting module; if the lexical content represented by the received machine language file is "Where am I", the recognition result processing module acquires the user's current location from a positioning module, and sends the location information to the voice broadcasting module;

the voice broadcasting module is used for converting the operation result sent by the recognition result processing module into an audio file to broadcast by combining the broadcast voice parameters.

In the related art, the broadcast voice parameters are selected and determined by the user according to options provided to users, or fixed in the voice broadcasting module before delivering from the factory. For the former, due to the user differences, different users may need to reset values of the voice broadcast voice parameters during the use, giving the users a complex and cumbersome nature of use; for the latter, because all the users use the same voice to broadcast, it results in a single and boring user experience.

SUMMARY

The purpose of an embodiment of the present document is to provide a self-adaptive intelligent voice device and method to solve the technical problem about how to make a broadcast voice more closely matching a user's voice.

To solve the abovementioned technical problem, the embodiment of the present document provides the following technical solution:

a self-adaptive intelligent voice device, wherein the device comprises a voice recognizing module, a recognition result processing module and a voice broadcasting module, wherein the device further comprises a broadcast voice parameter generating module, the broadcast voice parameter generating module is configured to: acquire extracted voice parameters from the voice recognizing module, generate broadcast voice parameters according to the voice parameters and a default policy, and input the broadcast voice parameters to the voice broadcasting module.

Alternatively, the broadcast voice parameter generating module is further configured to: acquire the voice parameters from the voice recognizing module after receiving a specific trigger signal or when the device is powered on.

Alternatively, the default policy comprises a corresponding relationship between the voice parameters and the broadcast voice parameters.

Alternatively, the broadcast voice parameter generating module is configured to generate broadcast voice parameters in accordance with the voice parameters and the default policy in the following manner:

acquiring values of the voice parameters, and determining values of the broadcast voice parameters corresponding to the values of the voice parameters through the default policy.

A self-adaptive intelligent voice method, wherein the method comprises:

after extracting voice parameters from a voice through voice recognition, generating broadcast voice parameters according to the voice parameters and a default policy;

using the broadcast voice parameters to generate a broadcast voice.

Alternatively, the step of generating the broadcast voice parameters according to the voice parameters as well as the default policy comprises:

after receiving a specific trigger signal or powered on, generating the broadcast voice parameters according to the voice parameters and the default policy.

Alternatively, the default policy comprises a corresponding relationship between the voice parameters and the broadcast voice parameters.

Alternatively, the step of generating the broadcast voice parameters according to the voice parameters as well as the default policy comprises:

acquiring values of the voice parameters, and determining values of the broadcast voice parameters corresponding to the values of the voice parameters through the default policy.

The abovementioned technical solution establishes a relationship between the broadcast voice parameters and the voice parameters input by a user through default policy, thus avoiding the inadequacy resulted from that the broadcast voice parameters use fixed data and do not consider the

PREFERRED EMBODIMENTS OF THE DOCUMENT

To make objectives, technical solutions and advantages of the present document more apparent, hereinafter in conjunction with the accompanying drawings, the embodiments of the present document will be described in detail. It should be noted that, in the case of no conflict, embodiments and features in the embodiment of the present application may be combined randomly with each other.

Figure 1:
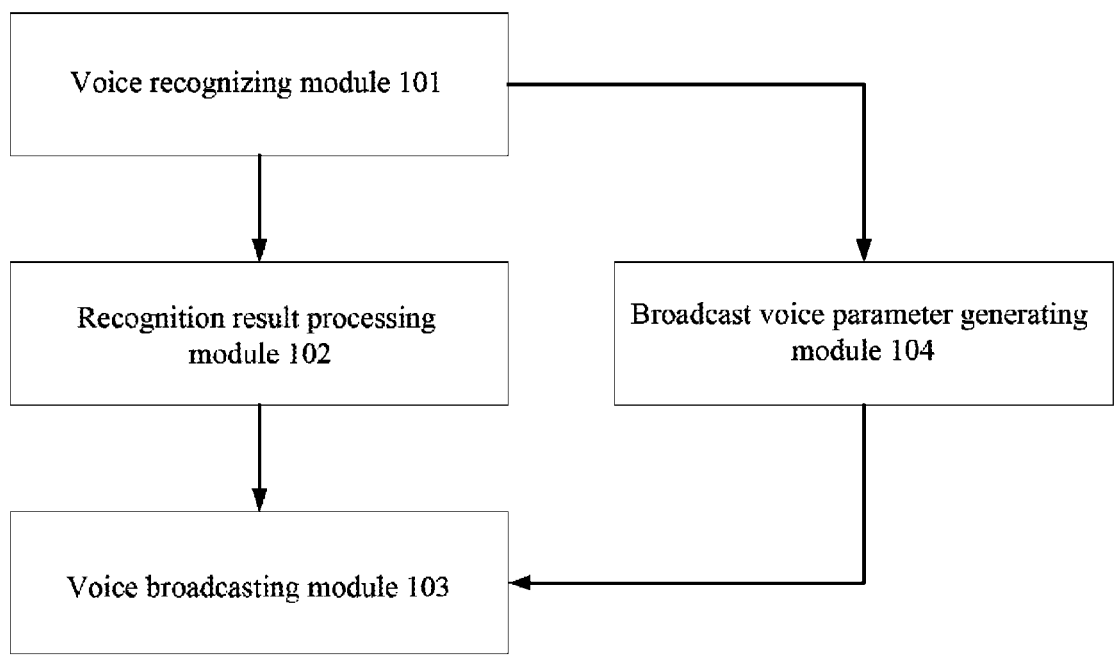
FIG. 1 is a block diagram of a self-adaptive intelligent voice device in accordance with an embodiment of the present document.

FIG. 1 is a block diagram of an self-adaptive intelligent voice device in accordance with an embodiment of the present document, as shown in FIG. 1, the device module comprises a voice recognizing module 101, recognition result processing module 102, voice broadcasting module 103 and broadcast voice parameter generating module 104. Wherein, the voice recognizing module 101, the recognition result processing module 102 and the voice broadcasting module 103 have been achieved in the related art, and are not repeated herein, the broadcast voice parameter generating module 104 is a new module added in the present embodiment, compared to the related art.

The broadcast voice parameter generating module 104 is configured to: acquire extracted voice parameters from the voice recognizing module 101, and generate broadcast voice parameters according to the extracted voice parameters and a default policy, and input the broadcast voice parameters to the voice broadcasting module 103.

The default policy provide a corresponding relationship between input parameters and output parameters, wherein the input parameters are the extracted voice parameters, and the output parameters are the broadcast voice parameters; the corresponding relationship may be a simple value corresponding relationship or a complex arithmetic operation.

After acquiring the values of the extracted voice parameters, the broadcast voice parameter generating module 104 determines values of the broadcast voice parameters corresponding to the values of the extracted voice parameters through the default policy, and further acquires the broadcast voice parameters.

The default policy can be as follows: when the input extracted voice parameters characterize a male voice, the output broadcast voice parameters characterize a female voice;
  when the input extracted voice parameters characterize a child voice, the output broadcast voice parameters characterize a child voice;
  the voice speed characterized by the output broadcast voice parameters and the voice speed characterized by the input extracted voice parameters are at the same level;
  the voice loudness characterized by the output broadcast parameters and the voice loudness characterized by the input extracted voice parameters are at the same level.

The broadcast voice parameter generating module 104 may acquire the extracted voice parameters from the voice recognizing module 101 after receiving a specific trigger signal (e.g., receiving an enabling self-adaptive intelligent voice instruction signal from a user) or when the device is powered on.

By setting the broadcast voice parameter generating module 104 in the intelligent voice device, the abovementioned embodiment makes the voice parameters used when broadcasting the voice take the voice parameters input by the user into account, thus achieving the effects of self-adaptively changing the broadcast voice in accordance with the difference of the user's voice characteristics, and compared with the existing technologies, it not only reduces the complexity of frequently setting the voice broadcast by different users, but also improves the flexibility and vitality of voice broadcast, thereby greatly improving the comfort of the human-machine interaction experience.

Figure 2:
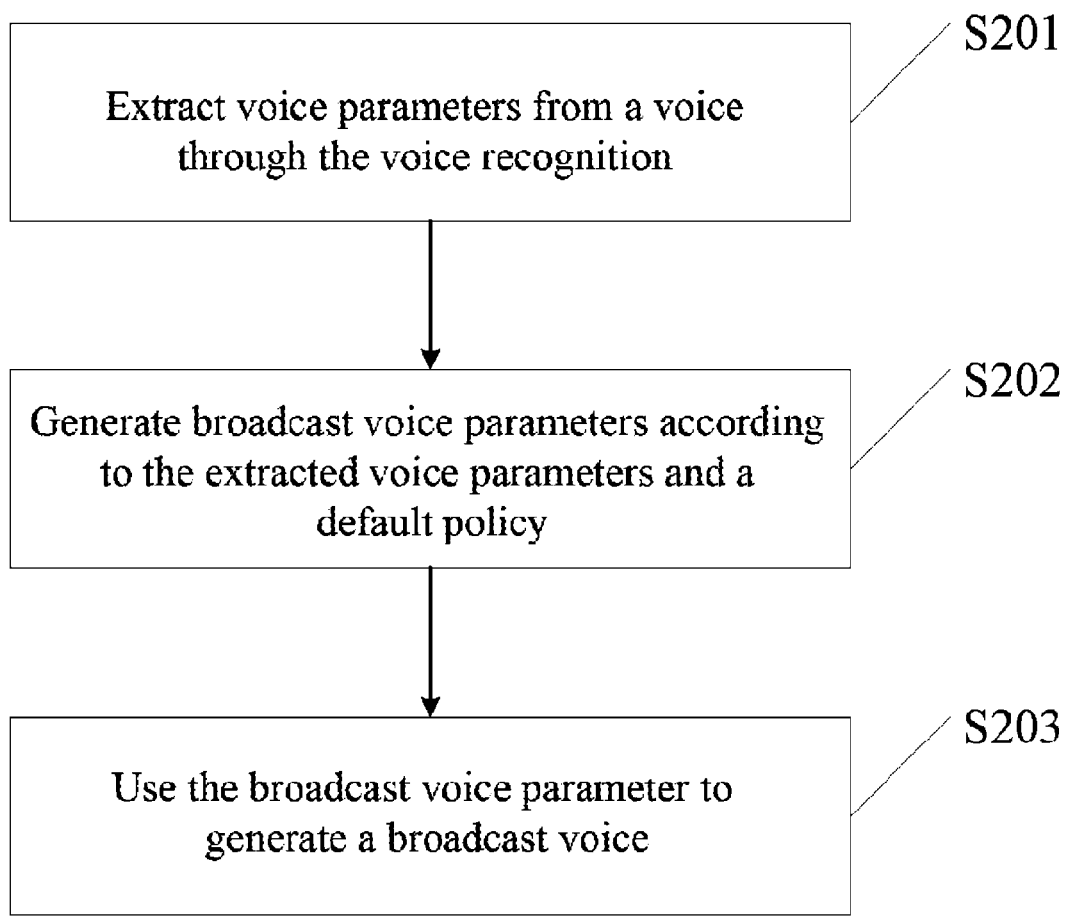
FIG. 2 is a flow chart of a self-adaptive intelligent voice method in accordance with an embodiment of the present document.

FIG. 2 is a flow chart of a self-adaptive intelligent voice method in accordance with an embodiment of the present document, and as shown in FIG. 2, the method mainly comprises the following steps.

In S201, it is to extract voice parameters from a voice through the voice recognition.

In S202, it is to generate broadcast voice parameters according to the extracted voice parameters and a default policy.

In this step, the broadcast voice parameters may be generated according to the extracted voice parameters and the default policy after receiving a specific trigger signal (e.g., receiving an enabling self-adaptive intelligent voice instruction signal from a user) or when powered on.

The default policy comprises a corresponding relationship between the voice parameters and the broadcast voice parameters: wherein the input parameters are the extracted voice parameters, and the output parameters are the broadcast voice parameters; the corresponding relationship may be a simple value corresponding relationship or a complex arithmetic operation.

After acquiring values of the extracted voice parameters, values of the broadcast voice parameters corresponding to the values of the voice parameters are determined through the default policy, and further the broadcast voice parameters are acquired.

The default policy can be as follows: when the input extracted voice parameters characterize a male voice, the output broadcast voice parameters characterize a female voice;
  when the input extracted voice parameters characterize a child voice, the output broadcast voice parameters characterize a child voice;
  the voice speed characterized by the output broadcast voice parameters and the voice speed characterized by the input extracted voice parameters are at the same level;
  the voice loudness characterized by the output broadcast parameters and the voice loudness characterized by the input extracted voice parameters are at the same level.

In S203, it is to use the broadcast voice parameter to generate a broadcast voice.

Those ordinarily skilled in the art can understand that all or some of steps of the abovementioned method may be completed by the programs instructing the relevant hardware, and the abovementioned programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

It should be noted that the present document may have a variety of other embodiments, and without departing from the spirit and essence of the present document, a person skilled in the art can make various corresponding changes and modifications according to the present document, and these corresponding changes and modifications should belong to the protection scope of the appended claims of the present document.

INDUSTRIAL APPLICABILITY

The abovementioned technical solution establishes a relationship between the broadcast voice parameters and the voice parameters input by a user through default policy, thus avoiding the inadequacy resulted from that the broadcast voice parameters use fixed data and do not consider the user's voice characteristics; in addition, the operation of the abovementioned technical solution generating the broadcast voice parameters does not require human intervention, thus providing users with a convenient use.

What is claimed is:

1. A self-adaptive intelligent voice device, wherein, the device comprises a voice recognizing module, a recognition result processing module and a voice broadcasting module, wherein, the device further comprises a broadcast voice parameter generating module,
   the broadcast voice parameter generating module is configured to: acquire extracted voice parameters from the voice recognizing module, generate broadcast voice parameters according to the extracted voice parameters and a default policy, and input the broadcast voice parameters to the voice broadcasting module;
   wherein, the extracted voice parameters and the broadcast voice parameters characterize at least one of a male voice, a female voice, a child voice, a voice speed, and a voice loudness; and
   wherein, the default policy comprises:
   when the extracted voice parameters characterize the male voice, the output broadcast voice parameters characterize the female voice;
   when the extracted voice parameters characterize the child voice, the output broadcast voice parameters characterize the child voice;
   the voice speed characterized by the output broadcast voice parameters and the voice speed characterized by the extracted voice parameters are at the same level;
   the voice loudness characterized by the output broadcast parameters and the voice loudness characterized by the extracted voice parameters are at the same level.

2. The self-adaptive intelligent voice device of claim 1, wherein, the broadcast voice parameter generating module is further configured to: acquire the voice parameters from the extracted voice recognizing module after receiving a specific trigger signal or when the device is powered on.

3. The self-adaptive intelligent voice device of claim 2, wherein, the default policy comprises a corresponding relationship between the extracted voice parameters and the broadcast voice parameters.

4. The self-adaptive intelligent voice device of claim 3, wherein, the broadcast voice parameter generating module is configured to generate the broadcast voice parameters in accordance with the extracted voice parameters and the default policies in a following manner:
   acquiring values of the extracted voice parameters, and determining values of the broadcast voice parameters corresponding to the values of the extracted voice parameters through the default policy.

5. The self-adaptive intelligent voice device of claim 1, wherein,
   the default policy comprises a corresponding relationship between the extracted voice parameters and the broadcast voice parameters.

6. The self-adaptive intelligent voice device of claim 5, wherein, the broadcast voice parameter generating module is configured to generate the broadcast voice parameters in accordance with the extracted voice parameters and the default policies in a following manner:
   acquiring values of the extracted voice parameters, and determining values of the broadcast voice parameters corresponding to the values of the extracted voice parameters through the default policy.

7. A self-adaptive intelligent voice method, wherein the method comprises:
   after extracting voice parameters from a voice through voice recognition, generating broadcast voice parameters according to the extracted voice parameters and a default policy;
   generating a broadcast voice by using the broadcast voice parameters;
   wherein, the extracted voice parameters and the broadcast voice parameters characterize at least one of a male voice, a female voice, a child voice, a voice speed, and a voice loudness; and
   wherein the default policy comprises:
   when the extracted voice parameters characterize the male voice, the output broadcast voice parameters characterize the female voice;
   when the extracted voice parameters characterize the child voice, the output broadcast voice parameters characterize the child voice;
   the voice speed characterized by the output broadcast voice parameters and the voice speed characterized by the extracted voice parameters are at the same level;
   the voice loudness characterized by the output broadcast parameters and the voice loudness characterized by the extracted voice parameters are at the same level.

8. The self-adaptive intelligent voice method of claim 7, wherein, the step of generating the broadcast voice parameters according to the extracted voice parameters and a default policy comprises:
   after receiving a specific trigger signal or when powered on, generating the broadcast voice parameters according to the extracted voice parameters and the default policy.

9. The self-adaptive intelligent voice method of claim 8, wherein,
   the default policy comprises a corresponding relationship between the extracted voice parameters and the broadcast voice parameters.

10. The self-adaptive intelligent voice method of claim 9, wherein, the step of generating the broadcast voice parameters according to the extracted voice parameters and a default policy comprises:

acquiring values of the extracted voice parameters, and determining values of the broadcast voice parameters corresponding to the values of the extracted voice parameters through the default policy.

11. The self-adaptive intelligent voice method of claim 7, wherein, the default policy comprises a corresponding relationship between the extracted voice parameters and the broadcast voice parameters.

12. The self-adaptive intelligent voice method of claim 11, wherein, the step of generating the broadcast voice parameters according to the extracted voice parameters and a default policy comprises:

acquiring values of the extracted voice parameters, and determining values of the broadcast voice parameters corresponding to the values of the extracted voice parameters through the default policy.

\* \* \* \* \*